United States Patent
Etherington et al.

[11] Patent Number: 5,387,073
[45] Date of Patent: Feb. 7, 1995

[54] SHUTTLECAR UNLOADING DEVICE

[75] Inventors: Michael Etherington, Abingdon; Michael R. Walker, Bristol, both of Va.

[73] Assignee: Dosco Overseas Engineering Ltd., Notts, England

[21] Appl. No.: 103,356

[22] Filed: Aug. 9, 1993

[51] Int. Cl.⁶ ............................................. B65G 67/24
[52] U.S. Cl. ................................. 414/353; 414/528; 414/574; 414/786
[58] Field of Search ............... 414/352, 353, 327, 389, 414/528, 386, 573, 574; 198/861.2, 550.2, 550.12

[56] References Cited

U.S. PATENT DOCUMENTS

| | | | |
|---|---|---|---|
| 1,746,127 | 2/1930 | Overholt | 414/574 X |
| 2,609,116 | 9/1952 | Beck | 414/528 |
| 2,637,457 | 5/1953 | Barrett | 414/528 |
| 3,209,932 | 10/1965 | Schlitz | 414/528 X |
| 4,081,094 | 3/1978 | Pereira et al. | 414/528 X |
| 4,243,353 | 1/1981 | Reed | 414/528 X |
| 4,494,903 | 1/1985 | Badicel et al. | 414/574 X |
| 4,588,072 | 5/1986 | Braun et al. | 198/861.2 X |
| 4,669,674 | 6/1987 | Oldengott et al. | 414/327 X |
| 4,881,691 | 11/1989 | Oldengott et al. | 414/574 X |
| 5,108,250 | 4/1992 | Fewin, Jr. et al. | 414/528 |

Primary Examiner—David A. Bucci
Attorney, Agent, or Firm—Webb Ziesenheim Bruening Logsdon Orkin & Hanson

[57] ABSTRACT

An elongated hopper for unloading a haulage vehicle for mined material has a length at least equal to the length of the haulage vehicle. The elongated hopper has a plurality of connected sections and each section has a horizontal conveyor pan with an L-shaped side member pivotally connected to each edge. A conveyor extends throughout the length of the hopper. The haulage vehicle is driven into the hopper through the inlet end prior to unloading and mined material is continuously discharged from the haulage vehicle onto the conveyor in the hopper as the haulage vehicle is driven out of the inlet end of the hopper.

20 Claims, 4 Drawing Sheets

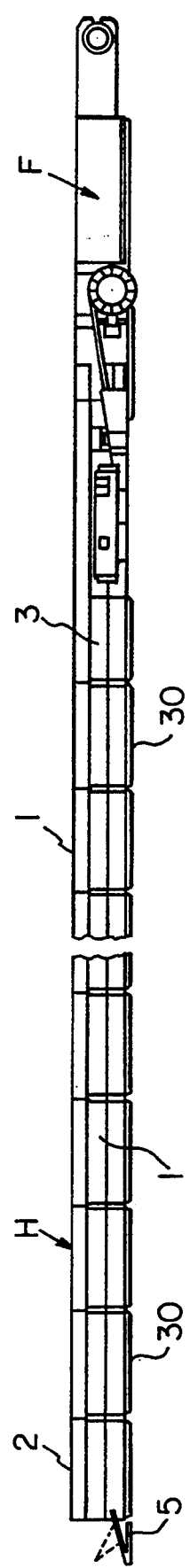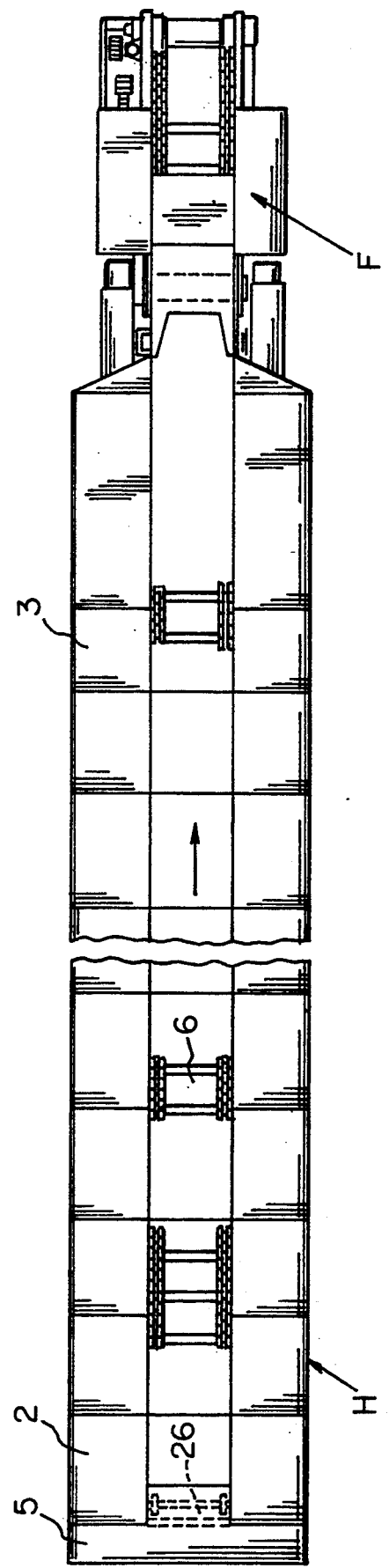
FIG. 1
FIG. 2

SHUTTLECAR UNLOADING DEVICE

BACKGROUND OF THE INVENTION

1. Field of the Invention

The invention relates generally to a device for the continuous unloading of mined material from a bidirectional shuttlecar and, more particularly, to a device for the continuous unloading of mined material from the elongated conveyor on a hi-directional shuttlecar onto a conveyor while the shuttlecar continuously moves in the direction opposite to the direction in which the elongated conveyor on the shuttlecar is moving at a rate of speed which is substantially the same as the rate of speed of the elongated conveyor.

2. Description of the Prior Art

It is well-known to transport mined material from a mine face to a location remote from the mine face by means of multisection elongated mobile conveyors; mobile haulage vehicles; and rail cars connected in a multicar train. The prior art mobile transfer vehicles for transporting mined material move from the mine face to the discharge location and stop to unload the mined material onto a conveyor or into a large funnel-like hopper of a feeder breaker. The speed at which the mined material is unloaded from a stationary mobile transfer vehicle is dictated by the linear speed of the mine conveyor onto which the mined material is unloaded or by the volume of the hopper which receives the mined material and the capacity of the feeder breaker to process the mined material supplied to the hopper. The unloading speed of the haulage vehicle must also be controlled to avoid excessive spillage of the mined material and jamming of either the mine conveyor or the feeder breaker which receives the mined material.

SUMMARY OF THE INVENTION

The invention relates to an elongated multisection generally U-shaped hopper device having a chain-type conveyor located therein at the bottom to receive mined material from the conveyor on a bidirectional shuttlecar and to a method of continuously and rapidly unloading mined material from the conveyor on a bi-directional shuttlecar. The mined material is laid on the conveyor in the hopper device which transports the mined material onto a mine conveyor which transports the mined material out of the mine or supplies the mined material to the hopper of a feeder breaker device.

One example of a hi-directional shuttlecar having an elongated conveyor for transporting mined material is disclosed in U.S. Pat. No. 5,301,787, entitled "Articulated Shuttlecar". The conveyor on the shuttlecar is loaded with mined material at a mine face by a continuous mining machine and the shuttlecar transports the mined material from the mine face to the elongated hopper device. The shuttlecar is driven completely into the elongated hopper device so that the discharge end of the shuttlecar is located above the discharge end of the conveyor on the bottom of the elongated hopper device. After the shuttlecar is properly positioned within the hopper device, movement of the shuttlecar conveyor is initiated in the direction toward the discharge end of the hopper device. Simultaneously with the initiation of the movement of the shuttlecar conveyor, the shuttlecar traction motor is started to move the shuttlecar along the elongated hopper device in the direction away from the discharge end of the elongated hopper device. The rate of linear movement of the shuttlecar away from the discharge end of the elongated hopper device and the rate of linear movement of the shuttlecar conveyor in the opposite direction are coordinated so as to be substantially equal. For example, if the shuttlecar moves out of the inlet end of the entry section of the elongated hopper device at a speed of 100 feet per minute, the shuttlecar conveyor moves along the shuttlecar in the opposite direction at approximately 100 feet per minute to continuously lay mined material from the shuttlecar conveyor onto the conveyor on the bottom of the elongated hopper device. By properly coordinating the rate of linear movement of the shuttlecar in a first direction with the rate of linear movement of the shuttlecar conveyor in a second opposite direction, the shuttlecar conveyor is completely empty when the end of the discharge section of the shuttlecar passes out of the inlet end of the entry section of the elongated hopper device.

This unloading device and the method of unloading the shuttlecar conveyor provide for the rapid and continuous discharge of mined material from the shuttlecar conveyor onto the conveyor at the bottom of the elongated hopper device without interruption of the discharge of mined material from the shuttlecar conveyor.

A complete understanding of the invention will be obtained from the following description when taken in connection with the accompanying drawings wherein like reference characters identify like parts throughout.

BRIEF DESCRIPTION OF THE DRAWINGS

FIG. 1 is an elevation of a multisection hopper device according to the invention connected to a feeder breaker;

FIG. 2 is a plan view of the structure shown in FIG. 1;

DESCRIPTION OF THE PREFERRED EMBODIMENTS

With reference to FIGS. 1-4 of the drawings, the elongated hopper device H has a conveyor 6 at the bottom for receiving mined material from the conveyor 12 on a bi-directional shuttlecar S which transports the mined material from a mine face. Hopper conveyor 6 supplies the mined material to a mine conveyor (not shown) or to the hopper of a feeder breaker F such as is manufactured by Long-Ardox Co. Feeder breakers are well-known in the art and the specific structure of the feeder breaker forms no part of the present invention.

The elongated hopper device of the instant invention permits a hi-directional shuttlecar S to continuously discharge mined material from shuttlecar conveyor 12 as the shuttlecar moves along the elongated hopper device in the direction away from the discharge end of the elongated hopper device to return to the mine face for reloading with mined material. The continuous unloading of the shuttlecar conveyor while the shuttlecar is in motion minimizes the time required to unload the shuttlecar and return it to the mine face to receive another load of mined material from a continuous mining machine located at the mine face.

Figure 3:
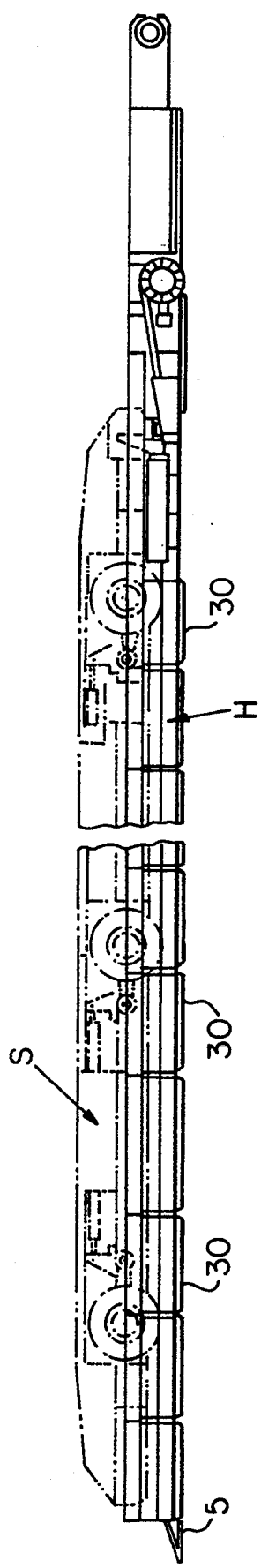
FIG. 3 is an elevation similar to FIG. 1 with a bi-directional shuttlecar located within the hopper device.

Elongated hopper device H is formed by a plurality of individual aligned sections 1 which are connected at the ends to form a substantially continuous hopper having a length slightly greater than the length of the shuttlecars which are to be unloaded. An entry section 2 is located at the inlet end of hopper device H and a discharge section 3 is located at the opposite end of the hopper device. The opposite end of the discharge section may be connected to the supply hopper of a feeder breaker F of known construction as shown in FIGS. 1–4 of the drawings. Alternatively, the exit end of discharge section 3 of the hopper device H can be operatively connected to the inlet end of a conveyor located in the mine entry. The inlet end of entry section 2 of hopper device H may be provided with ring bolts or towing points/eyes (not shown) for connecting the elongated hopper device to a shuttlecar S or to another vehicle to move the hopper device from one location to another. The inlet end of entry section 2 is also provided with a pivotally mounted ramp 5 as shown in FIGS. 1–4 of the drawings. The ramp is lowered as shown in FIGS. 1 and 3 of the drawings to receive the wheels 10 of a shuttlecar S when the shuttlecar is moving into and out of the hopper device and is raised when the hopper device is to be moved along the mine floor.

Figure 5:
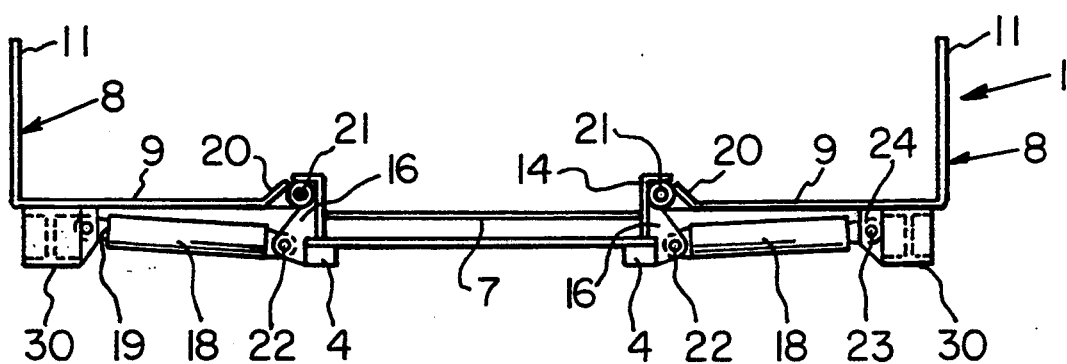
FIG. 5 is an end view of a section of a hopper device.
Figure 6:
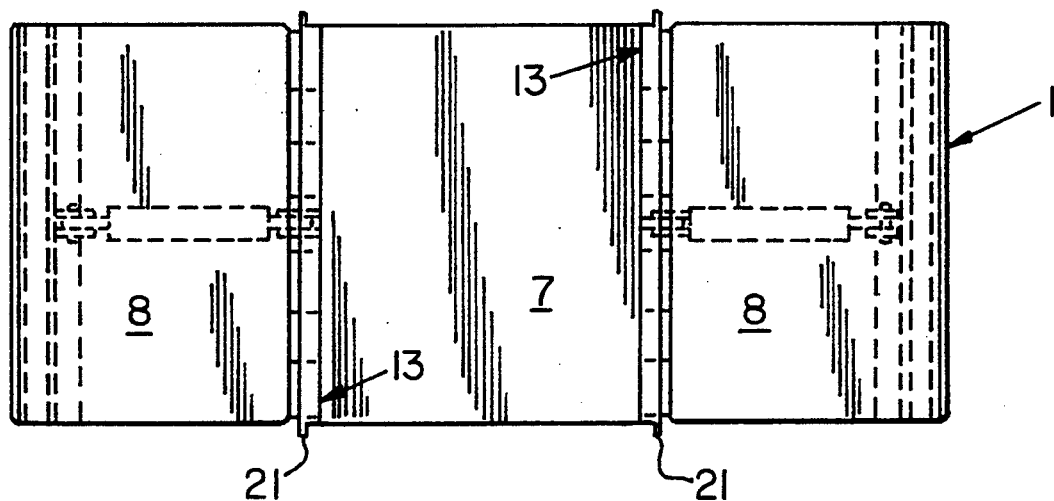
FIG. 6 is a plan view of the hopper device shown in FIG. 5.
Figure 7:
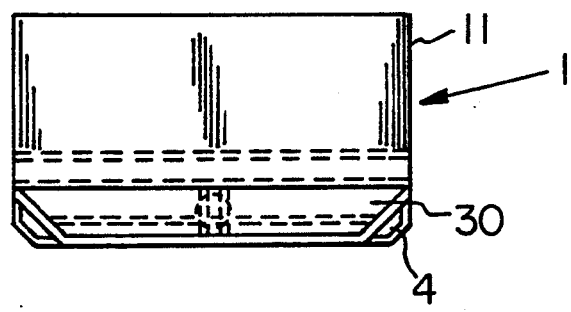
FIG. 7 is a side elevation of the hopper device shown in FIG. 5.
Figure 8:
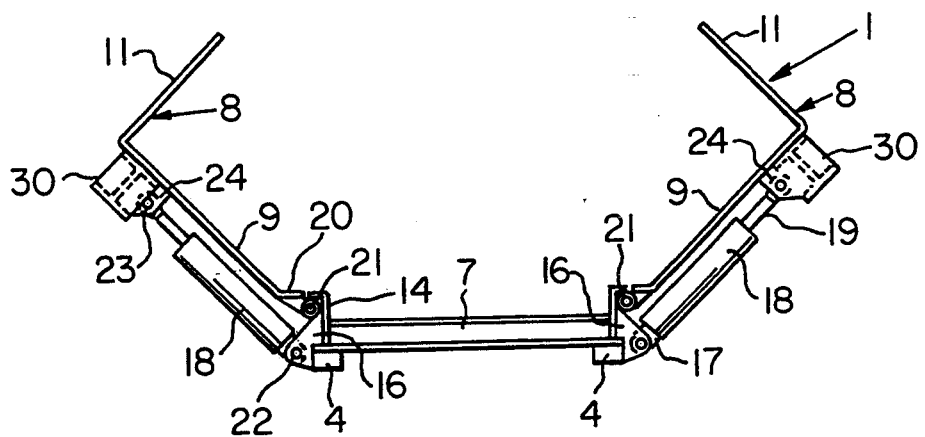
FIG. 8 is an end view of a hopper device with the side sections raised.
Figure 9:
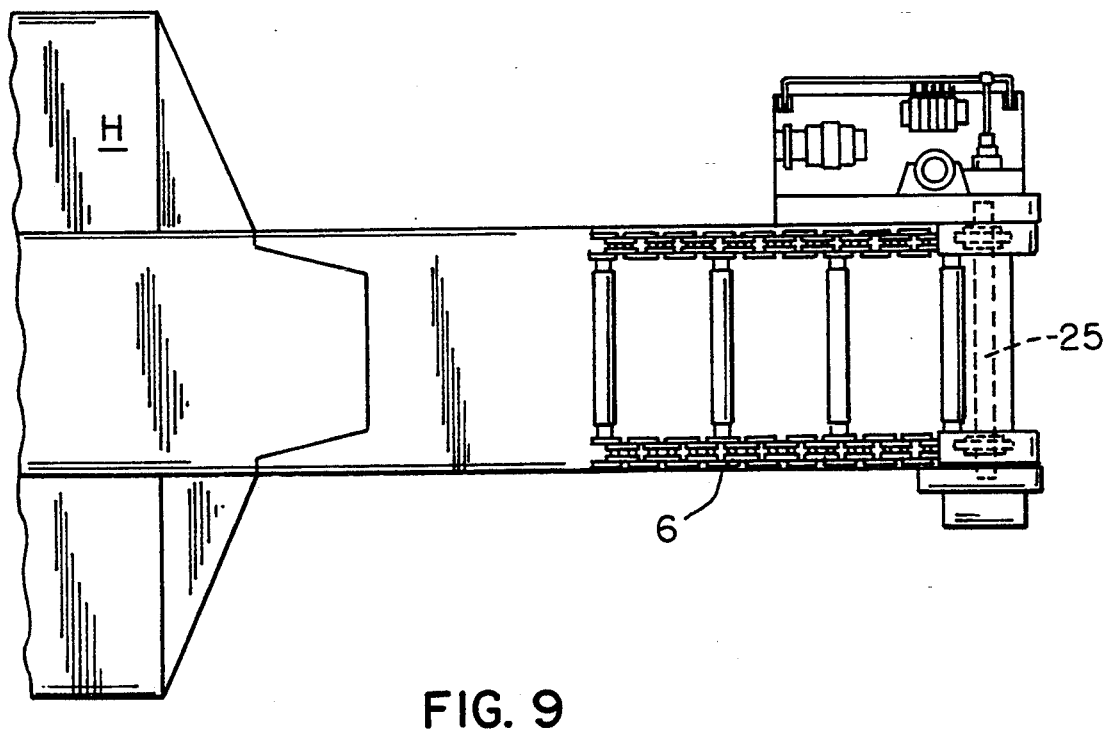
FIG. 9 is a plan view of the discharge end of the hopper device showing the conveyor control station.

Each section 1 of elongated hopper device H is provided with a plurality of longitudinal skids which support the section on the mine floor and permit the section to slide along the mine floor. As shown in FIGS. 5 and 8 of the drawings, each section has spaced inner skids 4 welded to the bottom surface of conveyor pan 7 at each longitudinal edge and outer skids 30 welded to the bottom surface of each L-shaped member 8 at the outer longitudinal edge of track plate 9. The ends of intermediate hopper sections 1 are connected as required by standard connection arrangements (not shown) such as dog bone connectors to provide an elongated hopper device having a length at least equal to the length of the bidirectional shuttlecars which are to be unloaded. An elongated conveyor 6 extends along the length of hopper device H from the inlet end of entry section 1 to the opposite end of discharge section 3. Conveyor 6 is a standard chain conveyor having an upper flight passing over the upper surface of conveyor pan 7 in each section of the elongated hopper and a return flight passing below the lower surface of the conveyor pan in each section. Conveyor 6 passes over a drive sprocket 25 located at the opposite end of discharge section 3 of the hopper device and over an idler sprocket 26 located at the inlet end of entry section 2 of the hopper device in a manner which is well-known to those skilled in the art.

With reference to FIGS. 5–8 of the drawings, it will be seen that each section 1, 2 and 3 of elongated hopper H has a central conveyor pan 7 having spaced longitudinal edges. An L-shaped side member 8 having a track plate 9 and a retaining plate 11 is pivotally connected to each longitudinal edge of conveyor pan 7 by a hinge arrangement 13. Each hinge arrangement 13 includes an elongated upstanding member 14 welded along a longitudinal edge of conveyor pan 7. Longitudinally spaced eyes are formed along the upper edge of each member 14 and staggered spaced eyes are formed along the inner edge of an angularly and upwardly extending lip 20 on the inner longitudinal edge of track plate 9. The eyes on track plates 9 fit between the eyes on member 14 when a section is assembled and an elongated hinge pin 21 is fitted through the eyes to pivotally connect an L-shaped side member 8 to conveyor pan 7 at an edge of the conveyor pan. A clevis 16 is welded to each longitudinal edge of conveyor pan 7 approximately midway along the length of the pan and a tongue 17 formed on one end of a hydraulic cylinder 18 is pivotally connected to clevis 16 by a pivot pin 22. Each hydraulic cylinder 18 has a piston rod 19 extending out of the end opposite the end having tongue 17. The distal end of piston rod 19 is pivotally connected by a pin 23 to a clevis 24 which is welded to the bottom surface of track plate 9 of L-shaped side member 8 at the outer edge of the track plate approximately midway of the length of the track plate.

As shown in FIG. 8 of the drawings, extension of piston rod 19 from hydraulic cylinder 18 pivots L-shaped side member 8 upwardly about elongated hinge pin 21 to rotate L-shaped side member 8 upwardly toward the longitudinal centerline of hopper device H. This movement of each L-shaped side member 8 permits any mined material which has collected on the upper surface of track plates 9 of the L-shaped side members during discharge from shuttlecar conveyor 12 and which has been retained on L-shaped side members 8 by retaining plates 11 to fall onto the upper surface of hopper device conveyor 6 for transportation to the discharge end of hopper device H.

Figure 4:
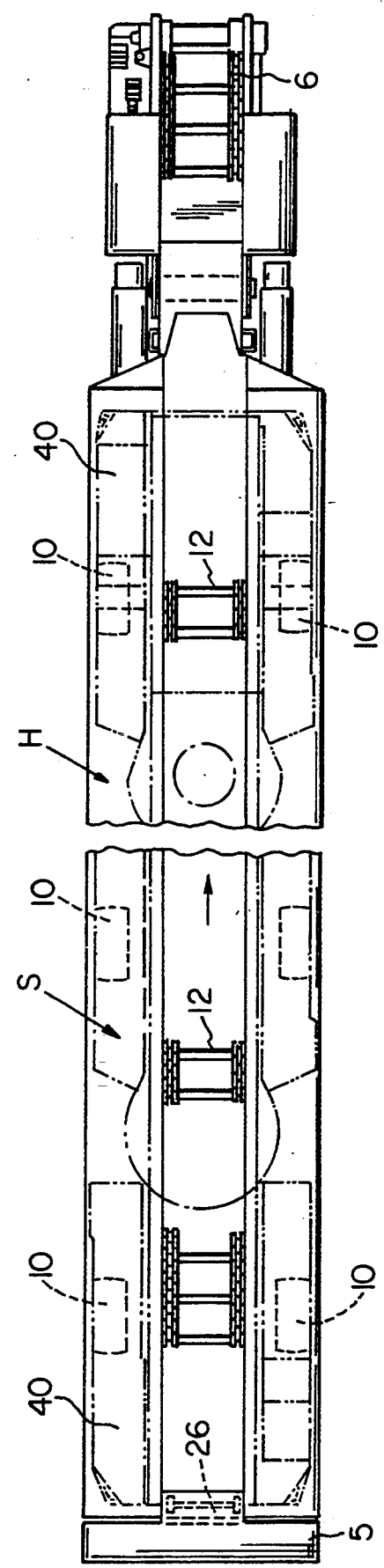
FIG. 4 is a plan view of the arrangement shown in FIG. 3.

At the beginning of the unloading cycle, each L-shaped side member 8 is in the lower position shown in FIGS. 1–6 of the drawings and track plates 9 are substantially horizontal to form substantially continuous parallel spaced platforms for wheels 10 of a bidirectional shuttlecar S which is to be unloaded. The shuttlecar drives up ramp 5 into the inlet end of entry section 2 of hopper device H with wheels 10 resting on the upper surfaces of track plates 9 as shown in FIGS. 3 and 4 of the drawings. The shuttlecar proceeds along the hopper device toward discharge section 3 until the discharge end of shuttlecar conveyor 12 is located at the opposite end of the discharge section of hopper device H. The movement of shuttlecar S is now terminated and unloading of shuttlecar conveyor 12 can begin.

In order to unload the conveyor on a multisection shuttlecar disclosed in U.S. Pat. No. 5,301,787, the shuttlecar drive motor for shuttlecar conveyor 12 is started to move the shuttlecar conveyor toward the discharge section of elongated hopper device H to discharge the mined material from the upper surface of the conveyor onto hopper conveyor 6. The shuttlecar traction motor is started at the same time as the shuttlecar conveyor motor to begin moving the shuttlecar out of the elongated hopper device away from discharge section 3. Thus, the programmable logic controller (P.L.C.) located in a shuttlecar operator station 40 activates the controller for the conveyor drive motor simultaneously with the shuttlecar traction motor. The linear speeds of the shuttlecar conveyor and the shuttlecar are substantially the same but the shuttlecar conveyor and the shuttlecar are moving in opposite directions. As the shuttlecar moves along track plates 9 in the elongated hopper device away from discharge section 3, mined material is laid on the upper surface of hopper conveyor 6 by shuttlecar conveyor 12. Any mined material which does not lie on the upper surface of hopper conveyor 12 is retained on the upper surfaces of the track plates by retaining plates 11 which are substantially vertical and form the opposed spaced sides of hopper device H. Because the rates of movement of shuttlecar S and shuttlecar conveyor 12 are substantially identical, the discharge of material from the shuttlecar conveyor will be substantially completed when the shuttlecar exits the inlet end of entry section 2 of hopper device H.

After all of the material has been discharged from the shuttlecar conveyor, a pressure transducer located in the hydraulic suspension system for the wheels on the discharge section of the shuttlecar sends a signal to the P.L.C. to stop the conveyor drive motor and simultaneously increase the speed of the shuttlecar traction motor to return the shuttlecar to the mine face at a greater speed than the speed along the elongated hopper device during unloading of the mined material from the shuttlecar conveyor. It will be seen that during the unloading portion of the shuttlecar operating cycle, the speed of the shuttlecar traction motor is limited to the speed of the shuttlecar conveyor drive motor so that material is continuously unloaded from the shuttlecar conveyor as the shuttlecar moves along the elongated hopper and unloading is completed when the shuttlecar reaches the entry section of the elongated hopper. This permits continuous unloading of the shuttlecar conveyor without stopping the shuttlecar during unloading and decreases the length of the shuttlecar operating cycle.

While the above description is for unloading a shuttlecar as disclosed in U.S. Pat. No. 5,301,787, the elongated hopper device may also be used to unload a standard haulage vehicle such as a wheel mounted dump shuttlecar. When used with a standard haulage vehicle, the vehicle unloading will be controlled manually by the operator. Additionally, the length of the elongated hopper is slightly greater than the length of the vehicle to allow for manual control and operator error.

While specific embodiments of the invention have been described in detail herein, it will be appreciated by those skilled in the art that various modifications and alternatives to the embodiments could be developed in light of the overall teachings of the disclosure. Accordingly, the particular arrangement is illustrative only and is not limiting as to the scope of the invention which is to be given the full breadth of the appended claims and any and all equivalents thereof.

We claim:

1. Apparatus for unloading loose material from a conveyor on an elongated wheel mounted haulage vehicle having a finite length and wherein the conveyor has a length substantially equal to the finite length of the elongated haulage vehicle, said apparatus including an elongated hopper device having a total length at least as long as the finite length of an elongated haulage vehicle to be unloaded, said elongated hopper device adapted to receive the complete finite length of an elongated haulage vehicle to be unloaded prior to initiating the unloading of the conveyor on the haulage vehicle, said elongated hopper device having a plurality of individual sections including at least an entry section and a discharge section connected to said entry section, each of said plurality of sections having a first end connected to a first end of an adjacent section, said entry section having a second inlet end, said discharge section having a second exit end, an elongated hopper conveyor extending substantially from said inlet end of said entry section to said exit end of said discharge section, whereby an elongated haulage vehicle to be unloaded is driven completely into said hopper device above said elongated hopper conveyor prior to initiating the discharge of substantially all of said loose material from the conveyor on the haulage vehicle directly onto said elongated hopper conveyor.

2. Apparatus as set forth in claim 1 wherein said elongated hopper device includes at least one intermediate section located between said entry section and said discharge section, said at least one intermediate section having opposed ends, one of said opposed ends connected to said first end of said entry section and the other of said opposed ends connected to said first end of said discharge section.

3. Apparatus as set forth in claim 1 wherein each of said plurality of sections of said elongated hopper device includes a horizontal central conveyor pan having spaced substantially parallel longitudinal edges, an L-shaped side member having a first longitudinal edge adjacent to each longitudinal edge of said conveyor pan, means for pivotally connecting each longitudinal edge of said conveyor pan to a longitudinal edge of one of said L-shaped side members and means extending between said conveyor pan and each of said L-shaped side members for rotating said L-shaped side members relative to said conveyor pan.

4. Apparatus as set forth in claim 2 wherein each of said plurality of sections of said elongated hopper device includes a horizontal central conveyor pan having spaced substantially parallel longitudinal edges, an L-shaped side member having a first longitudinal edge adjacent to each longitudinal edge of said conveyor pan, means for pivotally connecting each longitudinal edge of said conveyor pan to a longitudinal edge of one of said L-shaped side members and means extending between said conveyor pan and each of said L-shaped side members for rotating said L-shaped side members relative to said conveyor pan.

5. Apparatus as set forth in claim 3 wherein each of said L-shaped side members includes a track plate having said first longitudinal edge pivotally connected to a longitudinal edge of said pan formed thereon, said track plate having an upper surface adapted to receive the haulage vehicle wheels and a retainer plate extending upwardly from said track plate to contain mined material in said elongated hopper device on said upper surface of said track plate of each of said sections of said elongated hopper device.

6. Apparatus as set forth in claim 4 wherein each of said L-shaped side members includes a track plate having said first longitudinal edge pivotally connected to a longitudinal edge of said pan formed thereon, said track plate having an upper surface adapted to receive the haulage vehicle wheels and a retainer plate extending upwardly from said track plate to contain mined material in said elongated hopper device on said upper surface of said track plate of each of said sections of said elongated hopper device.

7. Apparatus as set forth in claim 3 wherein said means for rotating each of said L-shaped side members relative to said conveyor pan is a hydraulic cylinder having a first end and a second end, means for pivotally connecting said first end of said hydraulic cylinder to said conveyor pan, a piston rod extending from said second end of said hydraulic cylinder, said piston rod having a distal end and means for pivotally connecting said distal end of said piston rod to said L-shaped side member to rotate said L-shaped side member relative to said conveyor pan.

8. Apparatus as set forth in claim 4 wherein said means for rotating each of said L-shaped side members relative to said conveyor pan is a hydraulic cylinder having a first end and a second end, means for pivotally connecting said first end of said hydraulic cylinder to said conveyor pan, a piston rod extending from said second end of said hydraulic cylinder, said piston rod having a distal end and means for pivotally connecting said distal end of said piston rod to said L-shaped side member to rotate said L-shaped side member relative to said conveyor pan.

9. Apparatus as set forth in claim 5 wherein said means for rotating each of said L-shaped side members relative to said conveyor pan is a hydraulic cylinder having a first end and a second end, means for pivotally connecting said first end of said hydraulic cylinder to said conveyor pan, a piston rod extending from said second end of said hydraulic cylinder, said piston rod having a distal end and means for pivotally connecting said distal end of said piston rod to said L-shaped side member to rotate said L-shaped side member relative to said conveyor pan.

10. Apparatus as set forth in claim 1 including a ramp pivotally connected at said second inlet end of said entry section of said elongated hopper device to receive the wheels of a haulage vehicle when in the lower position.

11. Apparatus as set forth in claim 1 wherein each of said sections of said elongated hopper includes a plurality of spaced lower skids for supporting said section on a mine floor.

12. Apparatus as set forth in claim 1 wherein said elongated hopper conveyor is a chain conveyor and including idler sprocket means at said second inlet end of said entry section for supporting said chain conveyor and drive sprocket means at said second opposite end of said discharge section for moving said chain conveyor along said conveyor pan, whereby said chain conveyor extends from said idler sprocket means at said second inlet end of said entry section of said elongated hopper device over said drive sprocket means at said second opposite end of said discharge section of said elongated hopper device.

13. Apparatus as set forth in claim 2 wherein said elongated hopper conveyor is a chain conveyor and including idler sprocket means at said second inlet end of said entry section for supporting said chain conveyor and drive sprocket means at said second opposite end of said discharge section for moving said chain conveyor along said conveyor pan, whereby said chain conveyor extends from said idler sprocket means at said second inlet end of said entry section of said elongated hopper device over said drive sprocket means at said second opposite end of said discharge section of said elongated hopper device.

14. Apparatus as set forth in claim 12 including drive means connected to said drive sprocket means for said chain conveyor and control means for operating said drive means.

15. Apparatus as set forth in claim 13 including drive means connected to said drive sprocket means for said chain conveyor and control means for operating said drive means.

16. A method of discharging mined material from an elongated conveyor extending from a first end of a wheel mounted haulage vehicle to a second end of said wheel mounted haulage vehicle onto a conveyor in an elongated hopper device having a discharge end, said elongated hopper device having a length at least equal to the length of said wheel mounted haulage vehicle and track means in said elongated hopper device to receive the wheels on said wheel mounted haulage vehicle, said method of discharging mined material comprising moving said elongated haulage vehicle into said elongated hopper device until said first end of said wheel mounted haulage vehicle and an end of said elongated conveyor are adjacent to said discharge end of said conveyor in said elongated hopper, initiating movement of said elongated conveyor on said haulage vehicle in a direction toward said discharge end of said conveyor in said elongated hopper device and simultaneously initiating movement of said haulage vehicle in said elongated hopper device in a direction away from said discharge end of said conveyor in said elongated hopper device, whereby said elongated conveyor on said wheel mounted haulage vehicle continuously lays mined material on said conveyor in said elongated hopper device as said wheel mounted haulage vehicle moves out of said elongated hopper device away from said discharge end of said conveyor in said elongated hopper device.

17. A method as set forth in claim 16 wherein the linear speed of said elongated conveyor on said wheel mounted haulage vehicle in a first direction is substantially the same as the linear speed of said wheel mounted haulage vehicle away from said discharge end of said conveyor in said elongated hopper device, whereby said elongated conveyor on said wheel mounted haulage vehicle is empty of mined material as said wheel mounted haulage vehicle passes out of said elongated hopper device.

18. A method as set forth in claim 17 including increasing the linear speed of said wheel mounted haulage vehicle when said first end of said wheel mounted haulage vehicle leaves said elongated hopper device, whereby said wheel mounted haulage vehicle returns to a mine face to receive another load of mined material at a rate of speed in excess of the rate of speed within said elongated hopper device during discharge of mined material from said elongated hopper on said wheel mounted haulage vehicle.

19. Apparatus for unloading loose material from an elongated wheel mounted haulage vehicle having a finite length, said apparatus including an elongated hopper device having a total length at least as long as the finite length of an elongated haulage vehicle to be unloaded, said elongated hopper device adapted to receive an elongated haulage vehicle to be unloaded prior to initiating the unloading of the haulage vehicle, said elongated hopper device having a plurality of individual sections including at least an entry section and a discharge section connected to said entry section, each of said plurality of sections of said elongated hopper having a first end connected to a first end of an adjacent section, said entry section having a second inlet end, said discharge section having a second exit end, an elongated hopper conveyor extending substantially from said inlet end of said entry section to said exit end of said discharge section of said elongated hopper device, whereby an elongated haulage vehicle to be unloaded is driven completely into said hopper device prior to initiating the discharge of substantially all of the loose material from the haulage vehicle conveyor directly onto said elongated hopper conveyor.

20. Apparatus as set forth in claim 19 wherein said elongated hopper device includes at least one intermediate section located between said entry section and said discharge section, said at least one intermediate section having opposed ends, one of said opposed ends connected to said first end of said entry section and the other of said opposed ends connected to said first end of said discharge section.

* * * * *